E. P. JOHNSON.
STRAINER.
APPLICATION FILED JAN. 15, 1917.
1,304,059.
Patented May 20, 1919.
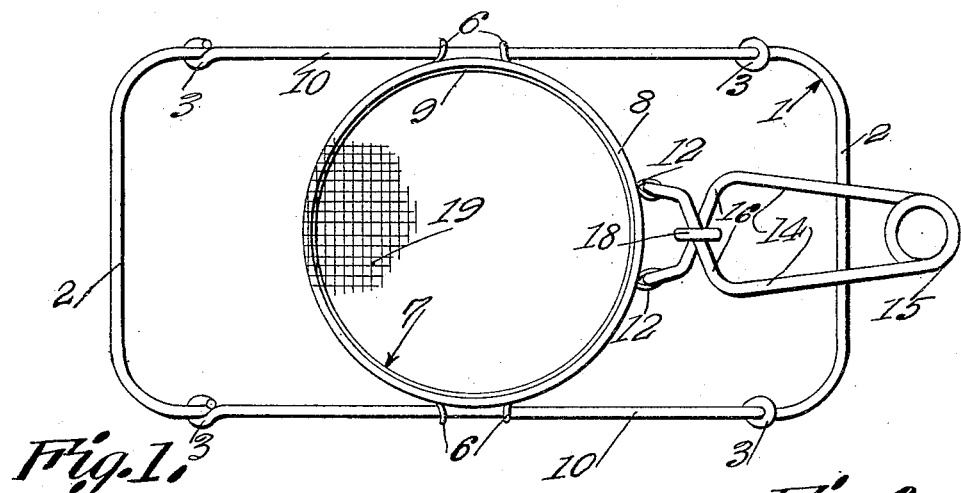
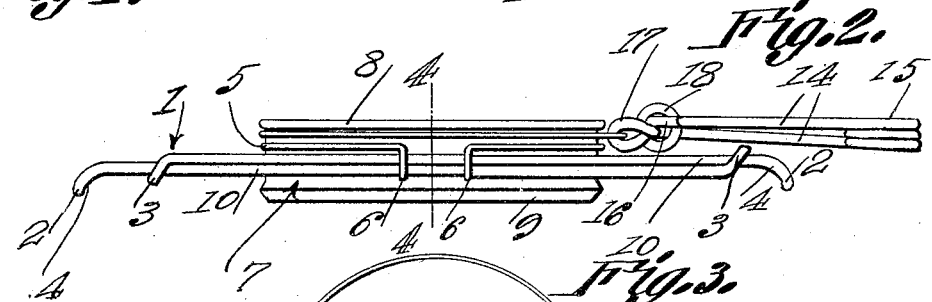
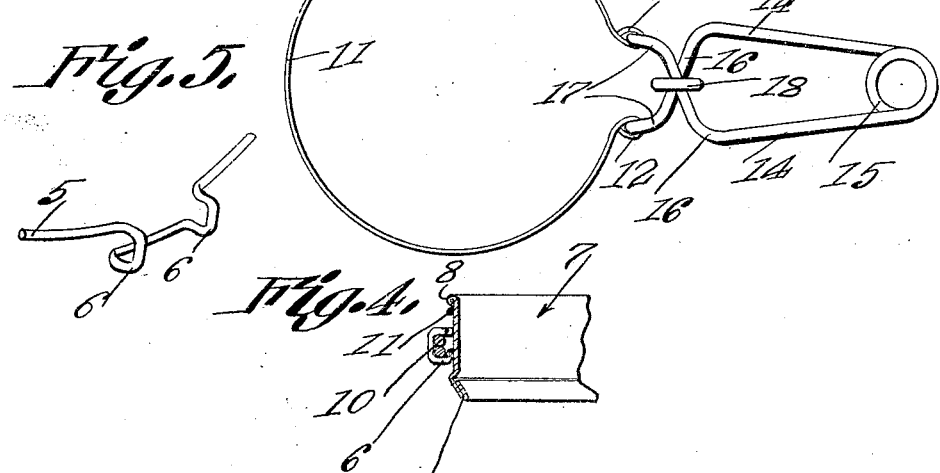
Witnesses
E. P. Johnson, Inventor
by C. A. Snow & Co., Attorneys

UNITED STATES PATENT OFFICE.

EDWARD P. JOHNSON, OF CHICAGO, ILLINOIS.

STRAINER.

1,304,059.     Specification of Letters Patent.     Patented May 20, 1919.

Application filed January 15, 1917. Serial No. 142,510.

*To all whom it may concern:*

Be it known that I, EDWARD P. JOHNSON, a citizen of the United States, residing at Chicago, in the county of Cook and State of Illinois, have invented a new and useful Strainer, of which the following is a specification.

The device forming the subject matter of this application is adapted to be employed for supporting a strainer above a pail or other receptacle.

The invention aims to provide a longitudinally extensible strainer support adapted to coöperate with pails of different diameters, novel means being provided whereby the strainer carrier is detachably and slidably assembled with the support.

Another object of the invention is to improve the grip which holds the strainer on the strainer carrier.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in top plan, a device constructed in accordance with the present invention, a portion of the strainer being broken away;

Fig. 2 is a side elevation of the structure shown in Fig. 1;

Fig. 3 is a plan of the strainer grip;

Fig. 4 is a section taken approximately on the line 4—4 of Fig. 2; and

Fig. 5 is a fragmental perspective showing a portion of the strainer carrier.

The device forming the subject matter of this application preferably but not necessarily is made of metal throughout and parts of the device may be made of wire.

The structure includes a longitudinally extensible support denoted by the numeral 1 and comprising a pair of U-shaped members 2 having side arms 10, the side arms 10 of the U-shaped members 2 being overlapped. The side arms 10 are provided with eyes 3, the eyes on one U-shaped member engaging the side arms of the other U-shaped member, in a manner which will be clearly understood from the drawings. The construction, obviously, is such that the support 1 may be elongated or contracted to any desired extent, thereby to fit on the upper edges of pails and other receptacles of different diameters. Preferably, the ends of the U-shaped members 2 which make up the support 1, are bent downwardly as shown at 4, to aid in holding the support 1 on a pail or other receptacle.

The invention includes a carrier 5, in the shape of a ring, mounted to slide for adjustment longitudinally of the support 1. At diametrically opposite points, the carrier or ring 5 is bent upon itself to form loop-shaped hooks 6 which engage slidably with the overlapped portions of the side arms 10 of the U-shaped members 2. The construction is such that the carrier 5 is upheld by the support 1, but may be adjusted longitudinally of the support.

The invention comprises a frame 7 preferably in the form of a ring, provided at its upper edge with a bead 8 and provided at its lower edge with a flange 9. The carrier or ring 5 has enough resiliency so that the frame or ring 7 may be introduced into the carrier 5.

Surrounding the ring 7 and located above the carrier 5 is a grip or ring 11, which is resilient. The ends of the ring 11 are provided with eyes 12.

The invention comprises a handle including a U-shaped member having side arms 14 connected by a helical spring 15, the side arms 14 merging into crossed fingers 16 having eyes 17 pivotally engaged with the eyes 12 of the grip ring 11. At their point of crossing, the fingers 16 are loosely connected by means of a link 18. The function of the link 18 is to prevent the fingers 16 from sprawling apart vertically, and to prevent the eye-carrying ends of the grip ring 11 from having relative vertical movement with respect to each other. The grip ring 11 is placed around the frame 7 above the carrier 5. The side arms 14 of the handle tend to expand and, consequently, the eye-carrying ends 12 of the grip ring 11 tend to move together, thereby causing the ring 11 to grip the frame 7 closely. In Fig. 3 of the drawings, it has been presupposed that the side arms 14 have been pressed toward each other to a slight extent, thereby separating the eyes 12.

A strainer 19, which may be a piece of cloth, is extended across the frame or ring 7 and is engaged peripherally by the grip ring 11. The grip ring 11 coöperates with the bead 8 on the frame 7, and with the carrier 5 to prevent the member 7 from sliding downwardly, these parts ordinarily being in contact. In the drawings, the bead 8, the grip ring 7 and the carrier 5 are shown as being spaced apart vertically, in order to clarify the drawings.

By simply pressing together the side arms 14 of the handle, the grip ring 11 may be expanded and its hold upon the frame 7 may be loosened, thereby to permit the strainer 19 to be removed. The frame 7 is supported by the carrier 5, and the carrier 5 may slide longitudinally of the support 1. The support 1, as hereinbefore pointed out, may be expanded or contracted longitudinally, at the will of an operator.

Having thus described the invention, what is claimed is:—

A device of the class described, comprising a longitudinally extensible loop-shaped support; an annular carrier within the support and provided with oppositely disposed projections engaged slidably with the side portions of the support; a ring removably held in the carrier; a resilient grip surrounding the ring; and a handle including crossed parts pivoted to the ends of the grip, said parts being compressible to effect an opening of the grip, the handle being of sufficient length to rest on one end of the support, the pivotal connection between the handle and the grip permitting the handle to be raised to secure a sliding of the carrier on the support and to permit the handle to rest on said end of the support.

In testimony that I claim the foregoing as my own, I have hereto affixed my signature in the presence of two witnesses.

EDWARD P. JOHNSON.

Witnesses:
J. C. Hussey, Jr.,
J. J. Shanahan.

Copies of this patent may be obtained for five cents each, by addressing the "Commissioner of Patents. Washington, D. C."